US00RE46112E

(19) United States
(12) Reissued Patent
Crabtree et al.

(10) Patent Number: US RE46,112 E
(45) Date of Reissued Patent: Aug. 16, 2016

(54) DUAL LOBE AIRSPRING

(71) Applicant: Vibracoustic North America, L.P., Plymouth, MI (US)

(72) Inventors: Michael L. Crabtree, Arvada, CO (US); Richard F. Stieg, Boulder, CO (US)

(73) Assignee: VIBRACOUSTIC NORTH AMERICA, L.P., Plymouth, MI (US)

(21) Appl. No.: 14/311,568

(22) Filed: Jun. 23, 2014

Related U.S. Patent Documents

Reissue of:
(64) Patent No.: 6,386,523
Issued: May 14, 2002
Appl. No.: 09/587,602
Filed: Jun. 5, 2000

U.S. Applications:
(60) Provisional application No. 60/139,056, filed on Jun. 11, 1999.

(51) Int. Cl.
*F16F 9/04* (2006.01)
*H04L 29/06* (2006.01)

(52) U.S. Cl.
CPC ..... *H04L 29/06* (2013.01)

(58) Field of Classification Search
CPC ..... H04L 29/06
USPC ..... 267/64.21, 64.24, 64.27, 122
See application file for complete search history.

(56) References Cited

U.S. PATENT DOCUMENTS 3,028,174 A * 4/1962 Gawronski ..... 267/64.21
3,045,582 A * 7/1962 Hirtretier ..... 267/64.27
3,438,309 A * 4/1969 Boileau ..... 267/64.24
3,549,142 A * 12/1970 Tilton ..... 267/64.24
3,596,895 A * 8/1971 Hirtreiter ..... 267/64.24

(Continued)

FOREIGN PATENT DOCUMENTS

JP 6-26554 A * 2/1994 ..... 267/122

OTHER PUBLICATIONS

Gieck, Jack. "Riding on air: a history of air suspension/Jack Gieck." Copyright 1999 Society of Automotive Engineers, Inc. 99-33364 CIP.

*Primary Examiner* — Matthew C Graham
(74) *Attorney, Agent, or Firm* — Dickinson Wright PLLC

(57) ABSTRACT

An air spring of the type with a sleeve having a first rolling lobe connected at an end to a first piston, a second rolling lobe connected to an end to a second piston, and where the first piston is substantially [frustoconical] *cylindrical* and the second piston is substantially [cylindrical] *frustoconical* and where the minimum effective area of the [first] *second* piston is less than the minimum effective area of the [second] *first* piston and where the maximum effective area of the [first] *second* piston is greater than the maximum effective area of the [second] *first* piston. The frustoconical [first] *second* piston allows the air spring to accommodate large angular suspension motion without degrading durability.

36 Claims, 7 Drawing Sheets

(56) References Cited

U.S. PATENT DOCUMENTS

| | | | | | |
|---|---|---|---|---|---|
| 3,790,147 | A | * | 2/1974 | Owen | 267/64.21 |
| 3,897,941 | A | * | 8/1975 | Hirtreiter et al. | 267/64.24 |
| 4,378,935 | A | | 4/1983 | Brown et al. | 267/64.27 |
| 4,493,481 | A | * | 1/1985 | Merkle | 267/64.27 |
| 4,518,154 | A | * | 5/1985 | Merkle | 267/64.24 |
| 4,629,170 | A | | 12/1986 | Warmuth, II | 267/64.27 |
| 4,635,745 | A | | 1/1987 | Myers et al. | 280/708 |
| 4,650,166 | A | * | 3/1987 | Warmuth | 267/64.27 |
| 4,688,774 | A | | 8/1987 | Warmuth, II | 267/64.21 |
| 4,718,650 | A | * | 1/1988 | Geno | 267/64.27 |
| 4,911,416 | A | | 3/1990 | Warmuth, II | 267/64.24 |
| 5,080,328 | A | | 1/1992 | Pees | 267/64.24 |
| 5,129,634 | A | | 7/1992 | Harris | 267/64.24 |
| 5,326,082 | A | * | 7/1994 | Ecktman et al. | 267/64.27 |
| 5,382,006 | A | | 1/1995 | Arnold | 267/64.27 |
| 5,413,316 | A | * | 5/1995 | Easter | 267/64.27 |
| 5,449,150 | A | | 9/1995 | Watanabe et al. | 267/64.24 |
| 5,535,994 | A | | 7/1996 | Safreed, Jr. | 267/64.27 |

* cited by examiner

DUAL LOBE AIRSPRING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims priority from U.S. Provisional application serial No. 60/139,056 filed Jun. 11, 1999.

BACKGROUND OF THE INVENTION

The invention relates to compressible fluid type spring devices for vehicle suspensions. More specifically, the invention relates to airsprings of the type with a flexible type rubber sleeve having rolling lobes.

Airsprings having a sleeve for forming a closed chamber to receive a pressurized fluid are well known. Usually, the airspring sleeve includes a corded fabric or a nylon cord to strengthen the sleeve and retain the sleeve shape.

Rolling lobe type airsprings are well known in the art and are made with a sleeve having a chamber portion connected to a closure [memeber] *member* and an inverted rolling lobe portion connection to a piston that partially reciprocates in the chamber portion of the sleeve. The general formula for calculating a spring rate of such an airspring is well known and documented such as in U.S. Pat. No. 4,629,170.

An airspring is a load support member that utilizes the compressible characteristics of air for a spring effect. One method of changing the spring rate of an airspring is to change the effective area that is acted on by the internal pressure of the spring. This is done by altering the external shape of the piston which laterally supports part of the rolling lobe portion of the sleeve. Theoretically, there is no change in effective area or spring rate if the piston is straight sided or cylindrical. However, a reduced effective area is achieved by a frustoconical shaped piston that reduces size as it enters the chamber portion; and an increase in spring rate is achieved by a frustoconically shaped piston whose size increases as it enters the chamber portion.

In use, rolling lobe airsprings typically encounter angular displacements or torque which result in ride harshness. The ride harshness is pronounced at low amplitude undulation of the vehicle. Rolling lobe airsprings having one piston and one rolling lobe can only compensate for very small angular displacements. Also, rolling lobe airsprings having two substantially cylindrical pistons and two rolling lobes, due to the increased amount of piston travel, can only compensate for very small angular displacements.

SUMMARY OF THE INVENTION

In accordance with the invention, an airspring and method are provided. The airspring has a construction that can accommodate large angular displacement of the vehicle suspension. The airspring construction can also be used to vary the spring rate associated with a piston entering and exiting an air chamber. An airspring is provided which has a sleeve having two rolling lobes and two pistons.

The first rolling lobe is connected at an end of the first rolling lobe to a first piston. The second rolling lobe is connected at an end of the second rolling lobe to a second piston. Each of the first and second pistons includes a rolling surface that in conjunction with the first and second rolling lobes defines an effective area for each of the first and second pistons. The minimum effective area of the second piston is less than the minimum effective area of the first piston and the maximum effective area of the second piston is greater than the maximum effective area of the first piston.

In a preferred embodiment of the invention, the first piston is substantially [frustoconical] *cylindrical* and the second piston is substantially frustoconcical. In an alternate embodiment, the geometric shape that determines the effective area need not be symmetrical about any axis and may describe any contour as required by a user.

An object of the invention is to provide an airspring design that includes two pistons and two rolling lobes with one of the pistons performing a majority of the longitudinal displacement.

An advantage of the invention is that large angular displacements of the vehicle suspension can be accommodated.

DESCRIPTION OF THE PREFERRED EMBODIMENTS

Figure 1:
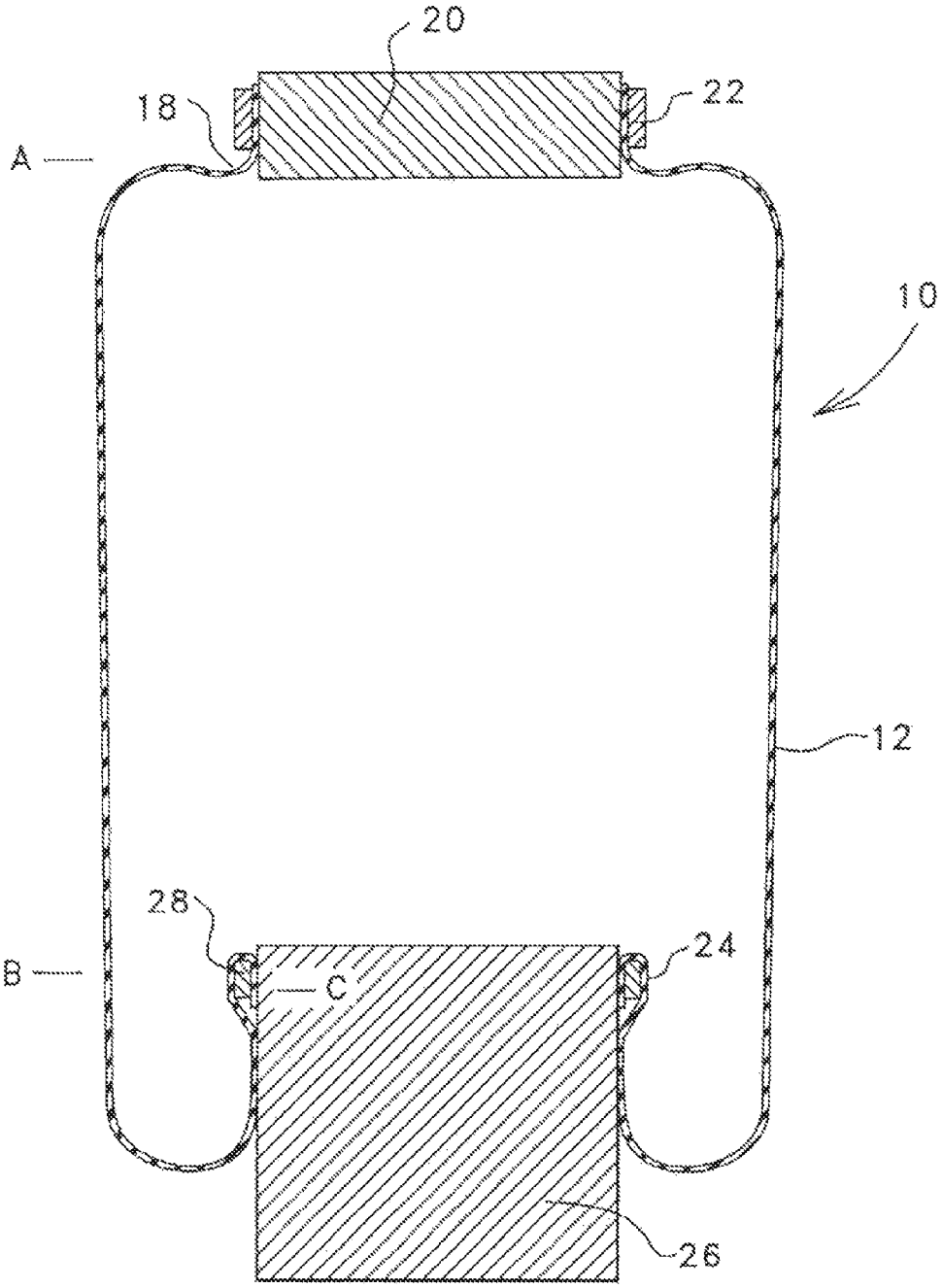
FIG. 1 is an axial cross section of a prior art airspring of the rolling lobe type.

FIG. 1 illustrates an airspring, indicated generally at 10, of a prior art construction. The airspring 10 includes a sleeve 12 having a chamber portion A-B and a rolling lobe portion B-C. The chamber portion A-B is connected at an end 18 to a closure member 20 by use of a mounting member 22. The rolling lobe portion B-C is connected at an end 24 to a piston 26 by use of a mounting member 28. In use, the piston 26 and the rolling lobe portion B-C moves into the chamber portion A-B. The closure member 20 however, is fixed with respect to the chamber portion A-B. Since the closure member 20 is fixed with respect to the chamber portion A-B, angular displacements of an unsprung portion (not shown) of a vehicle are not readily accommodated by the airspring 10.

Figure 2:
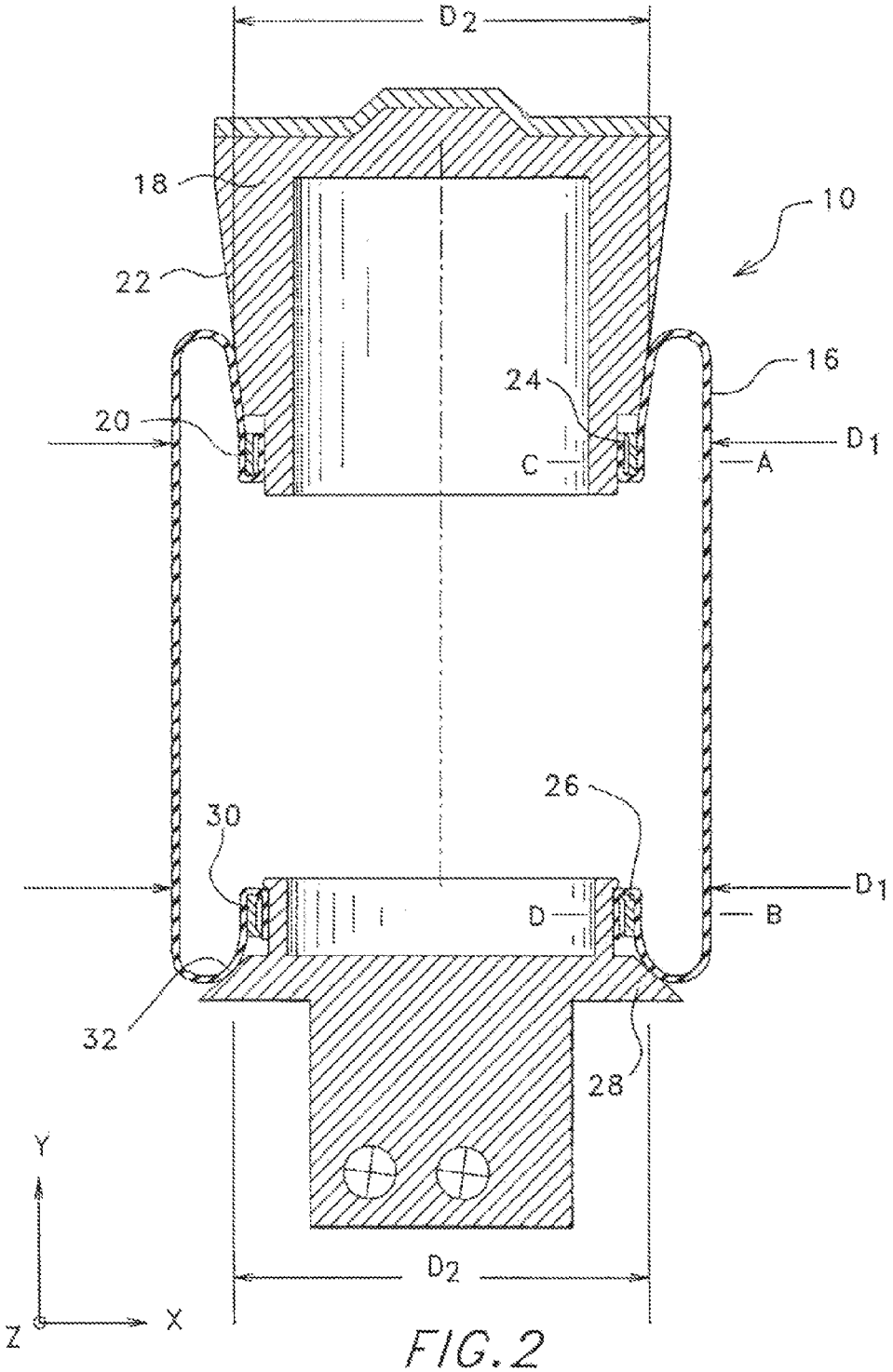
FIG. 2 is an axial cross section of the present invention.

An airspring, indicated generally at 10, is illustrated in FIG. 2. The airspring 10 is mounted to an unsprung portion (not shown) of a vehicle and a sprung portion (not shown) of a vehicle.

Figure 3:
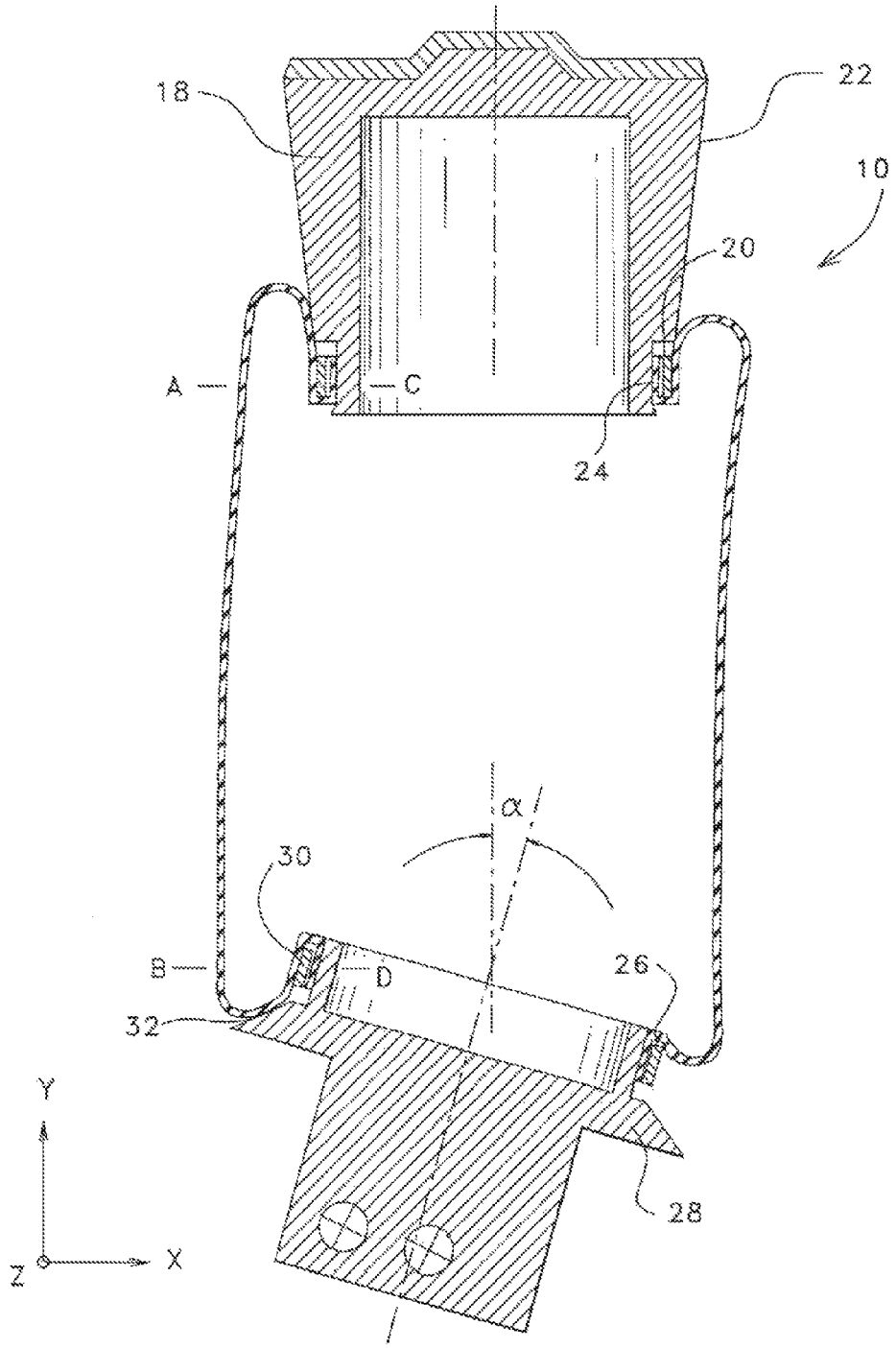
FIG. 3 is an axial cross section of the present invention at the end of the rebound stroke.

*FIG. 3 illustrates an example embodiment wherein the first piston 18 of the airspring 10 is coupled to a second portion 36 of a vehicle chassis, and the second piston 28 of the airspring 10 is coupled to a first portion 34 of the vehicle chassis. In the example of FIG. 3, the first piston 18 is fixed to the second portion 36 and the second piston 28 is fixed to the first portion 34 of the vehicle chassis. However, there could be another component (not shown) located between the first piston 18 and the second portion 36 of the vehicle chassis. There could also be another component (not shown) located between the second piston 28 and the first portion 34 of the vehicle chassis. For example, another frame or suspension component*

*could be disposed between the first piston 18 and the second portion 36 of the vehicle chassis or between the second piston 28 and the first portion 34 of the vehicle chassis. The additional component could also be used to couple the first piston 18 to the second portion 36 of the vehicle chassis, or to couple the second piston 28 to the first portion 34 of the vehicle chassis.*

The airspring 10 includes a sleeve 16 typically formed from a resilient material and embedded with a fibrous member of any suitable type such as made with synthetic fibers of nylon, rayon, polyester, fiberglass and aramid or natural fibers such as cotton. The sleeve 16 includes a closed chamber portion A-B for receiving pressurized air or fluid.

The chamber portion A-B interconnects a first rolling lobe A-C and a second rolling lobe B-D. Throughout this disclosure, the letters A-B are used to designate a chamber portion, the letters A-C are used to designate a first rolling lobe and the letters B-D are used to designate a second rolling lobe in order to facilitate an easy comparison of such portions in the various examples.

First rolling lobe A-C is connected at one end 24 to a first piston 18 by the use of a mounting member 20. The first piston 18 includes a rolling surface 22 which in conjunction with the first rolling lobe A-C defines an effective area which is acted on by the pressurized air in the closed chamber A-B.

Second rolling lobe B-D is connected at one end 26 to a second piston 28 by the use of a mounting member 30. The second piston 28 includes a rolling surface 32 which in conjunction with the second rolling lobe B-D defines an effective area which is acted on by the pressurized air in the closed chamber A-B.

Figure 4:
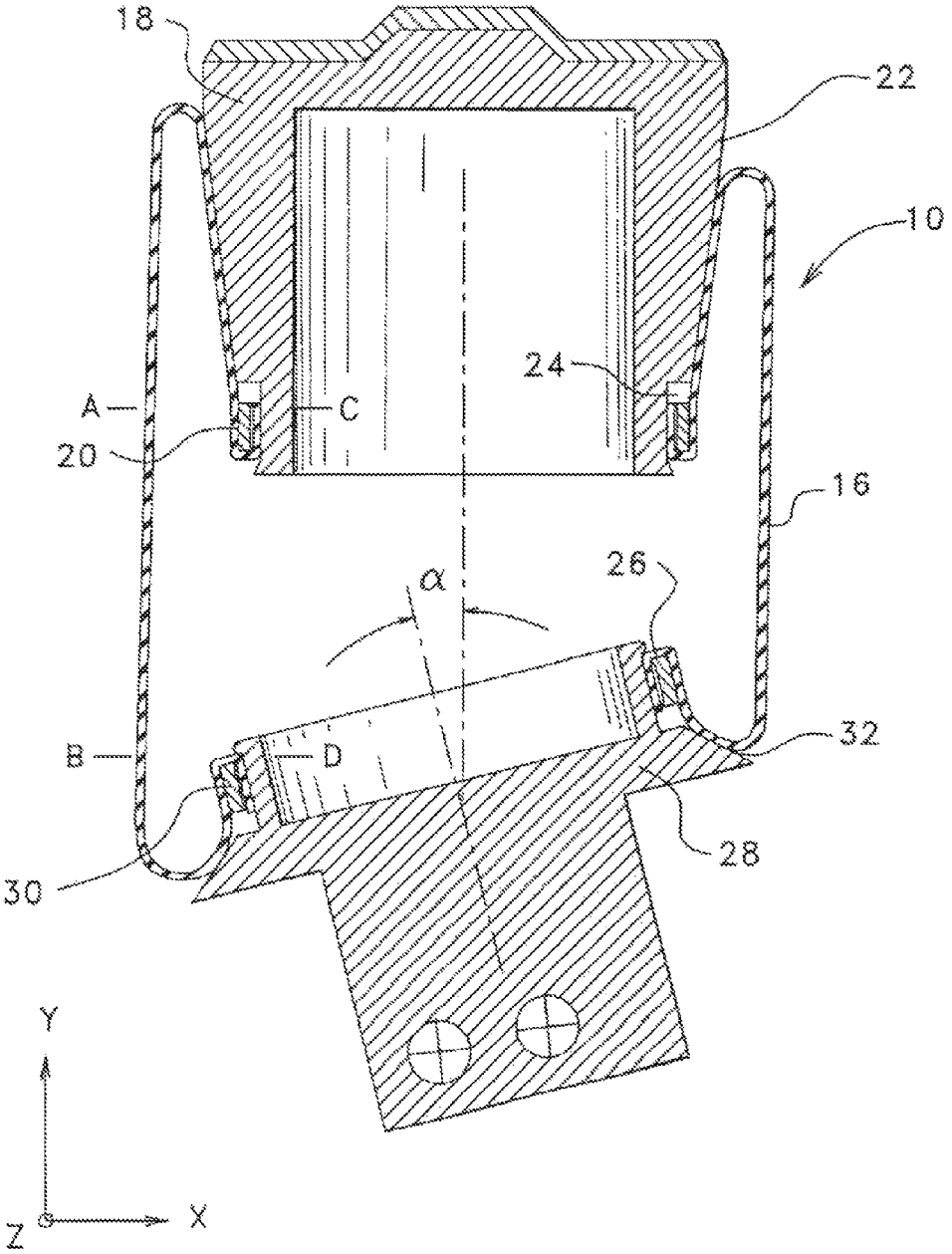
FIG. 4 is an axial cross section of the present invention at the end of the compression stroke.

In the preferred embodiment, FIGS. 2-4, the rolling surface 32 and the second rolling lobe B-D define a maximum effective area range which is greater than the maximum effective area range defined by the rolling surface 22 and the first rolling lobe A-C, and a minimum effective area that is less than the minimum effective area defined by the rolling surface 22 and the first rolling lobe A-C. The *rolling surface 22 of the* first piston 18 is substantially cylindrical and the rolling surface 32 of second piston 28 is substantially frustoconical*, as shown in FIGS. 2-4*. Surface 22 of first piston 18 may also be frustoconical [as shown in FIG. 2]. In use, the first piston 18 reciprocates longitudinally in and out of the chamber portion A-B. The second piston 28 is substantially static along the longitudinal axis.

FIG. 3 illustrates the airspring 10 in the maximum extended position, also known in the art as the rebound position. In the rebound position, the first piston 18 has partially reciprocated longitudinally out of the chamber portion A-B. The first rolling lobe A-C has traveled along the rolling surface 22. The rolling surface 32, due to angular displacement of the unsprung portion (not shown) of a vehicle, may contact the second rolling lobe B-D along only a portion of the second piston 28 circumference.

FIG. 4 illustrates the airspring 10 in the maximum compressed position. In the compressed position, the first piston 18 has reciprocated into the chamber portion A-B. The first rolling lobe A-C has traveled along the rolling surface 22. The rolling surface 32, due to angular displacement of the unsprung portion (not shown) of a vehicle, contacts the second rolling lobe B-D along all of the second piston 28 circumference. In addition, a portion of the second piston 28 has partially reciprocated into the chamber portion A-B. Since the rolling surface 32 and the second rolling lobe B-D define an maximum effective area which is greater than an effective area defined by the rolling surface 22 and the first rolling lobe A-C, the second piston 28 reciprocates into the chamber portion A-B less than the first [portion] *piston* 18. The angular displacement of the central axis of the second piston 28 as compared to a central axis of the first piston 18 is in the range of $\alpha=0°$ to 35°. One skilled in the art will appreciate that a movement of the first piston relative to the second piston is not necessarily coaxial nor is it necessarily constrained to any particular path or paths. By way of example, in certain operating situations, movement of the second piston will describe a path in two dimensions or in three dimensions relative to the first piston. In others, relative movement of each piston will be linear, but will not necessarily describe co-axial paths. In yet others, movement of the first piston and the second piston will each describe a path in three dimensions.

The behavior of the airspring is a function of the ratio of the effective area of the first piston, $A_{e1}$, and the effective area of the second piston, $A_{e2}$. The effective area for each piston is found by the following equation:

$$A_e=90\ /4[(D_1+D_2)/2]^2(0.9)$$

where $D_1$ is the diameter of the lobe at the piston and $D_2$ is the diameter of the piston at the tangent point of contact of the lobe on the piston surface. This equation may be adapted to accommodate a rolling surface, for example rolling surface 22 or 32, having a complex shape, meaning, the equation describing rolling surface 22 or 32 can be a first, second, third or greater order equation. The effective area equation then becomes:

$$A_e=\pi/4[(D_1(x)+D_2(x))/2]^2(0.9)$$

where $D_1(x)$ and $D_2(x)$ are functions which are unique to each end and piston of the airspring. In particular, $D_2(x)$ is the first, second, third or greater order surface of revolution equation describing the shape of the piston rolling surface 22 or 32. $D_1(x)$ may also describe a cylindrical, conical, ellipsoidal or other geometric shape depending on the form of the sleeve 16 at the particular end. Therefore, the size of the effective area of each piston can be variable along an axis depending on the shape of the piston rolling surface and of the sleeve. The movement of the airspring can then be predicted based upon the following relationships:

$$A_{e1}>A_{e2} \quad (1)$$

$$A_{e1}=A_{e2} \quad (2)$$

$$A_{e1}<A_{e2} \quad (3)$$

For equation (1), the lobe will roll on the rolling surface of piston 2 at a rate determined by the shape of the piston 2 effective area, until the effective areas of both pistons 1 & 2 are equal as described in equation (2). For equation (2), neither lobe will roll on either piston rolling surface. For equation (3), the lobe will roll on the rolling surface of piston 1 at a rate determined by the shape of the piston 1 effective area, until the effective areas of both pistons 1 & 2 are equal as described in equation (2). Therefore, the airspring will operate properly so long as at least one point in the range of the size of the variable effective area of the first piston is equal to at least one point in the range of the size of the variable effective area of the second piston. The equal point values may be adjusted to determine the travel of each piston relative to the other, or relative to another fixed point remote from the airspring, such as a vehicle chassis.

Figure 5:
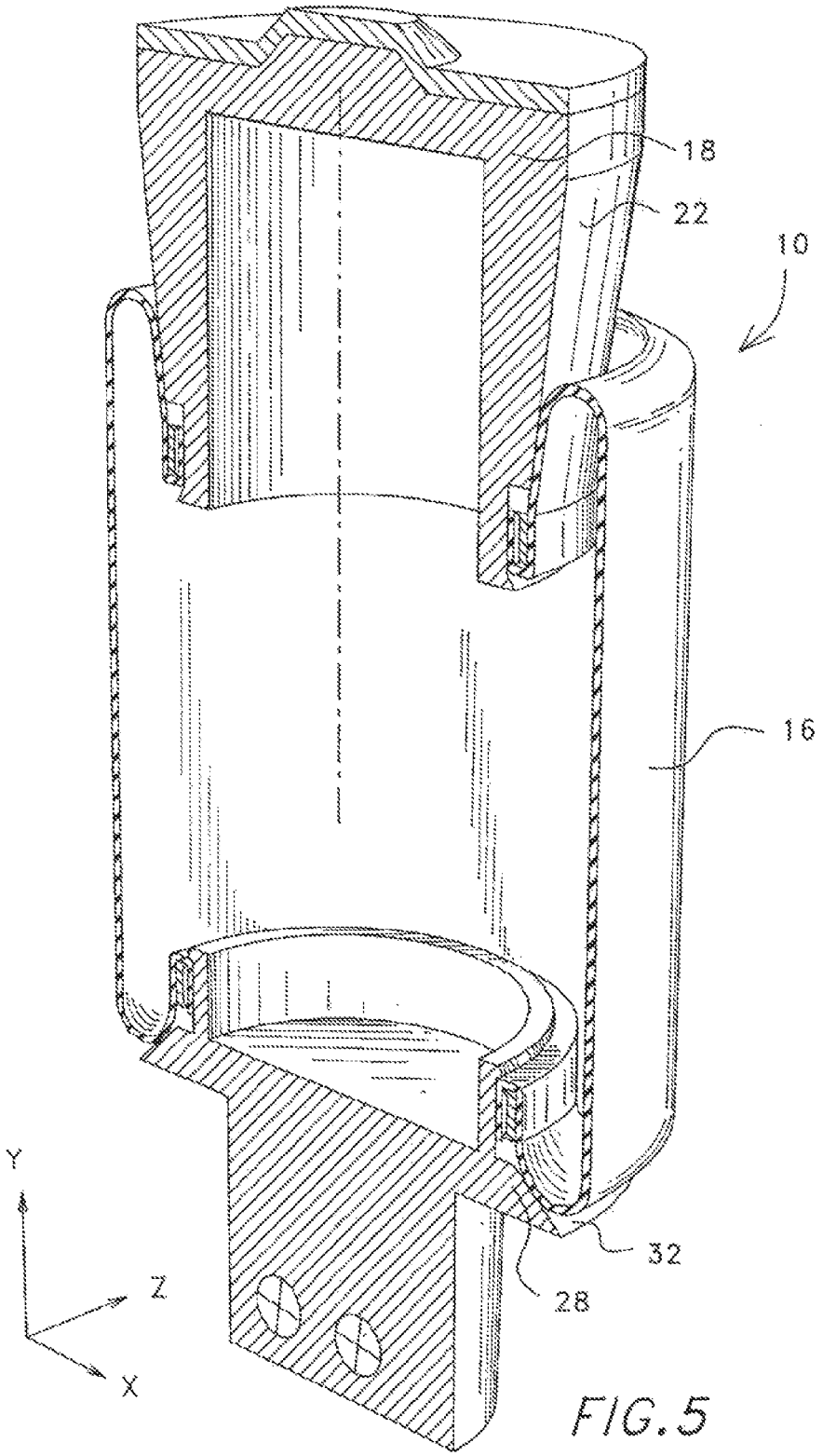
FIG. 5 is a perspective cross-sectional view of the present invention.

FIG. 5 is a perspective cross-sectional view of the present invention.

Figure 6:
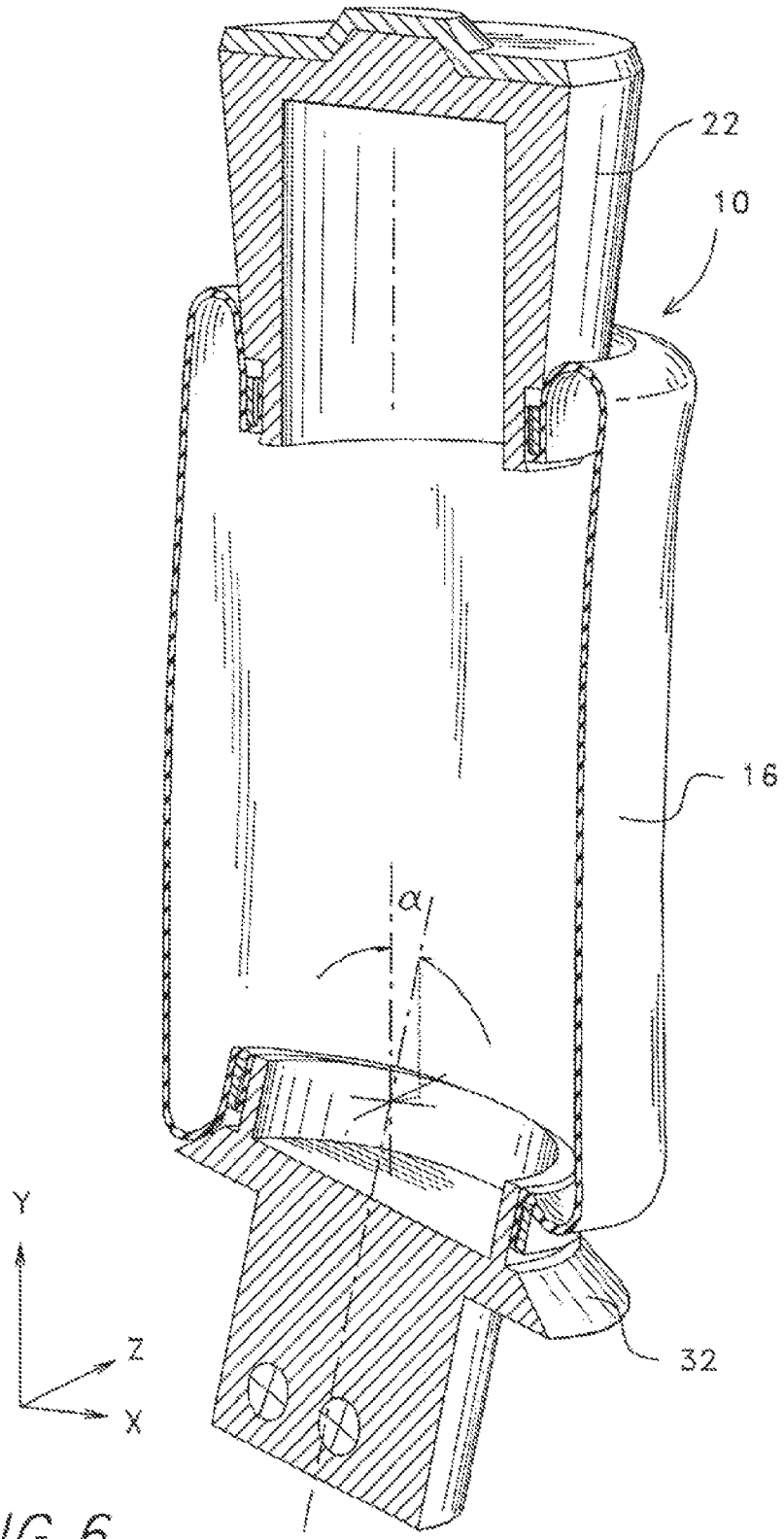
FIG. 6 is a perspective cross-sectional view of the present invention at the end of a rebound stroke.

FIG. 6 is a perspective cross-sectional view of the present invention at the end of a rebound stroke. The rotation/translation of second piston 28 is shown having angle $\alpha$ with reference to the y axis, although movement relative to the x and z axes is also possible. Second piston 28 is generally fixed to a frame (not shown). The inventive air spring can operate as a ball joint, accommodating rotational and translational movement imposed by the frame in any direction, which movements are symbolically represented in one position by the angle α. The first piston 18, while fixed to a moveable frame, may also rotate/translate in any of three dimensions in concert with the second piston 28 according to the movement of the frame. The frame in this description may comprise a suspension component of an automobile or truck chassis, or any other form of device using a system having interconnected components that require controlled relative movements. It is this unique ability to accommodate a wide variety of movements that allows the inventive air spring perform as a ball joint as well as an energy absorbing device. Of course, one of the pistons may be fixed to a frame while the other rotates/translates as shown in this FIG. 6.

Figure 7:
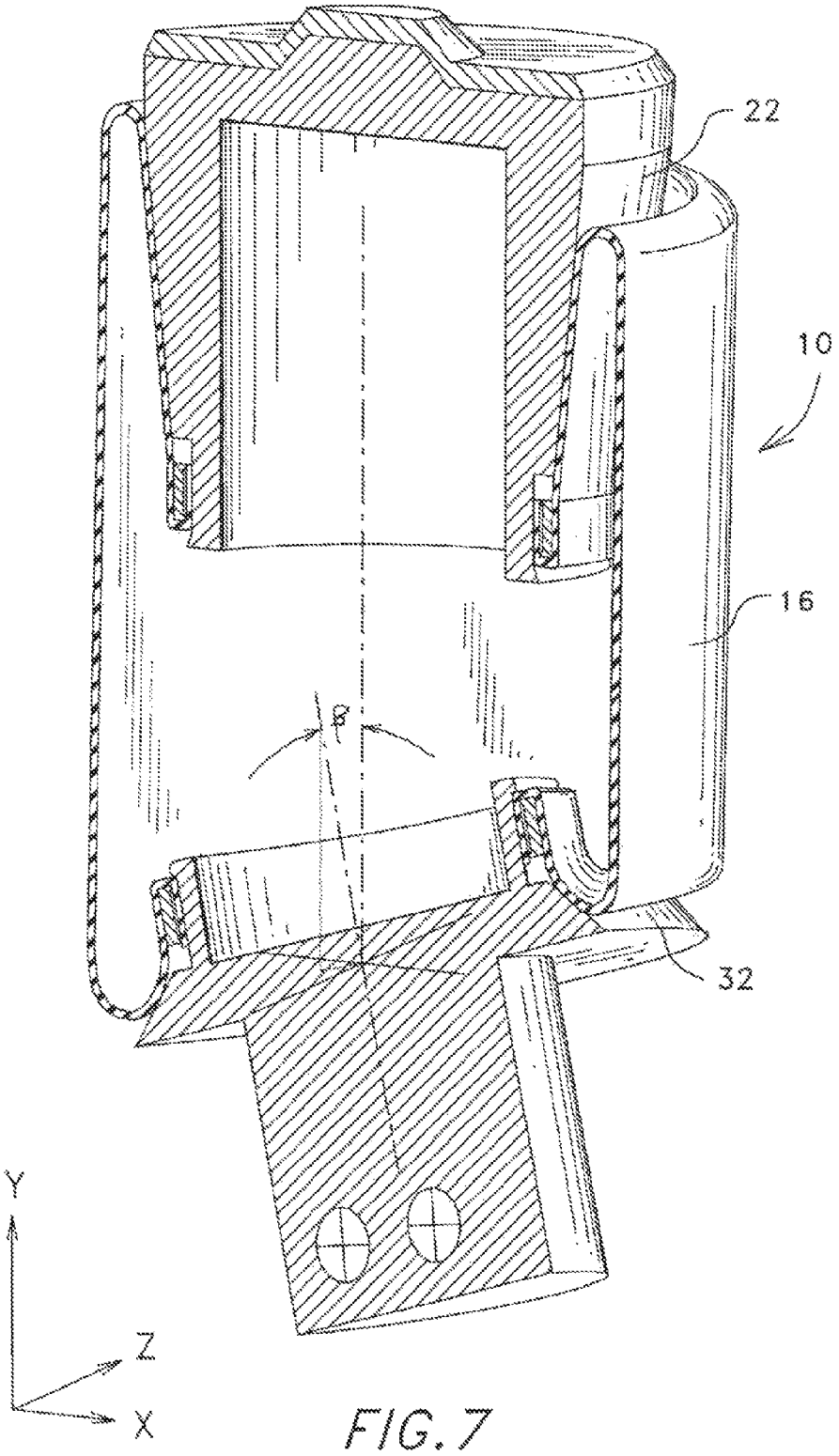
FIG. 7 perspective cross-sectional view of the present invention at the end of a compression stroke.

FIG. 7 is a perspective cross-sectional view of the present invention at the end of a compression stroke. The rotation/translation of second piston 28 is shown having angle β with reference to the x, y, and z axes. Angle β on the compression stroke need not be equivalent to angle α of the rebound stroke in FIG. 6. The angle may vary on each end of the stroke based upon the design needs of a user.

The foregoing detailed description is used for purpose of illustration only and is not intended to limit the scope of the invention which is to be determined from the appended claims.

What is claimed is:

1. An airspring comprising:

a sleeve having a first rolling lobe connected at an end to a first piston;

the sleeve having a second rolling lobe connected at an end to a second piston;

each of said first and second pistons comprising a rolling surface that in conjunction with the first rolling lobe and second rolling lobe defines an effective area for each of said first and second pistons;

the second piston maximum effective area is greater than the first piston maximum effective area;

the second piston minimum effective area is less than the first piston minimum effective area;

the first piston having a movement in an x, y, and z axis with respect to a vehicle chassis; and the second piston having a movement in an x, y, and z axis with respect to a vehicle chassis.

2. The airspring in claim 1, further comprising:

the first piston having a rotational movement about an axis; and the second piston having a rotational movement about an axis.

3. The airspring as claimed in claim 1 wherein the second piston is substantially frustoconical.

4. The airspring as claimed in claim 3 wherein the first piston is substantially cylindrical.

5. The airspring as in claim 3, wherein:

the first piston having a roll rate for the first rolling lobe;

the second piston having a roll rate for the second rolling lobe; and a roll rate for the first rolling lobe is not equal to a roll rate for the second rolling lobe.

6. The airspring as in claim 3, wherein:

the first piston is substantially frustoconical.

7. The airspring as in claim 2, wherein:

the second piston having a compression stroke describing an angle β and having a rebound stroke describing an angle α; and angle β is not coplanar with angle α.

*8. An airspring comprising:*

*a sleeve having a first rolling lobe connected at an end to a first piston;*

*the sleeve having a second rolling lobe connected at an end to a second piston;*

*each of said first and second pistons comprising a rolling surface that in conjunction with the first rolling lobe and second rolling lobe defines an effective area for each of said first and second pistons;*

*the second piston maximum effective area is greater than the first piston maximum effective area;*

*the second piston minimum effective area is less than the first piston minimum effective area;*

*the first piston having a movement in an x, y, and z axis and relative to a first portion of a vehicle chassis coupled to the second piston; and*

*the second piston having a movement in the x, y, and z axis and relative to a second portion of the vehicle chassis coupled to the first piston.*

*9. The airspring of claim 8, wherein the first piston has a rotational movement about its central axis; and the second piston has a rotational movement about its central axis.*

*10. The airspring of claim 8, wherein the rolling surface of the second piston is substantially frustoconical.*

*11. The airspring of claim 10, wherein at least a portion of the first piston is substantially cylindrical.*

*12. The airspring of claim 10, wherein the first piston has a roll rate for the first rolling lobe; the second piston has a roll rate for the second rolling lobe; and the roll rate for the first rolling lobe is not equal to the roll rate for the second rolling lobe.*

*13. The airspring of claim 8, wherein the rolling surface of the first piston is substantially frustoconical.*

*14. The airspring of claim 8, wherein a central axis of the second piston is disposed at an angle β relative to the y axis during a compression stroke, and a central axis of the second piston is disposed at an angle α relative to the y axis during a rebound stroke; and angle β is not equal to angle α.*

*15. The airspring of claim 8, wherein a central axis of the second piston is displaceable at an angle up to 35° relative to a central axis of the first piston.*

*16. The airspring of claim 8, wherein the rolling surface of the second piston presents a circumference surrounding a central axis, and when the airspring is in a rebound position the rolling surface of the second piston contacts the second rolling lobe along only a portion of the circumference, and when the airspring is in a compressed position the rolling surface of the second piston contacts the second rolling lobe along the entire circumference.*

*17. The airspring of claim 8, wherein the sleeve presents a closed chamber between the first piston and the second piston, and when the airspring moves between a rebound position and a compressed position the second piston reciprocates into the chamber less than the first piston.*

*18. The airspring of claim 8, wherein the size of the effective area of the first piston is variable from the first piston minimum effective area to the first piston maximum effective area.*

*19. The airspring of claim 18, wherein the size of the effective area of the second piston is variable from the second piston minimum effective area to the second piston maximum effective area.*

*20. The airspring of claim 8, wherein the effective area of the first piston and the effective area of the second piston is defined by the following equation:*

$$A_e=\pi/4[(D_1+D_2)/2]^2(0.9)$$

*where $A_e$ is the effective area, $D_1$ is the outside diameter of the lobe adjacent the piston when the lobe is acted on by pressurized fluid, and $D_2$ is the diameter of the piston at a tangent point of contact of the lobe on the rolling surface.*

*21. The airspring of claim 20, wherein the effective area of the first piston and the effective area of the second piston is defined by the following equation:*

$$A_e=\pi/4[(D_1(x)+D_2(x))/2]^2 \quad (0.9)$$

*where $A_e$ is the effective area, $D_1(x)$ and $D_2(x)$ are functions depending on the shape of the rolling surface and the sleeve.*

*22. The airspring of claim 8, wherein the first piston is fixable to and movable with a first component of a vehicle, and the second piston is fixable to and movable with a second component of the vehicle.*

*23. The airspring of claim 22, wherein the first component is at least one of the second portion of the vehicle chassis, a first frame component, and a first suspension component.*

*24. The airspring of claim 22, wherein the second component is at least one of the first portion of the vehicle chassis, a second frame component, and a second suspension component.*

*25. The airspring of claim 8, wherein the first portion of the vehicle chassis is fixed to the second piston.*

*26. The airspring of claim 8, wherein the second portion of the vehicle chassis is fixed to the first piston.*

*27. An airspring comprising:*

*a first piston disposed along a y axis and presenting a first rolling surface;*

*a second piston disposed along the y axis and presenting a second rolling surface;*

*a sleeve having a first rolling lobe with a first end connected to the first piston and a second rolling lobe with a second end connected to the second piston;*

*the first rolling surface in conjunction with the first rolling lobe defining a first effective area, the size of the first effective area variable from a minimum first effective area to a maximum first effective area;*

*the second rolling surface in conjunction with the second rolling lobe defining a second effective area, the size of the second effective area variable from a minimum second effective area to a maximum second effective area;*

*the size of the maximum second effective area being greater than the size of the maximum first effective area;*

*the size of the minimum second effective area being less than the size of the minimum first effective area; and*

*wherein the first piston moves along an x, y, and z axis with respect to a first portion of a vehicle chassis, and the second piston moves along the x, y, and z axis with respect to a second portion of the vehicle chassis.*

*28. The airspring of claim 27, wherein a central axis of the second piston is disposed at an angle β relative to the y axis during a compression stroke, and the central axis of the second piston is disposed at an angle α relative to the y axis during a rebound stroke; and angle β is not equal to angle α.*

*29. The airspring of claim 27, wherein a central axis of the second piston is displaceable at an angle up to 35° relative to a central axis of the first piston.*

*30. The airspring of claim 27, wherein the second rolling surface presents a circumference surrounding a central axis, and when the airspring is in a rebound position the second rolling surface contacts the second rolling lobe along only a portion of the circumference, and when the airspring is in a compressed position the second rolling surface contacts the second rolling lobe along the entire circumference.*

*31. The airspring of claim 27, wherein the first piston is fixable to and movable with a first component of a vehicle, and the second piston is fixable to and movable with a second component of the vehicle.*

*32. The airspring of claim 31, wherein the first component is at least one of the second portion of the vehicle chassis, a first frame component, and a first suspension component.*

*33. The airspring of claim 31, wherein the second component is at least one of the first portion of the vehicle chassis, a second frame component, and a second suspension component.*

*34. The airspring of claim 27, wherein the first portion of the vehicle chassis is fixed to the second piston.*

*35. The airspring of claim 27, wherein the second portion of the vehicle chassis is fixed to the first piston.*

*36. The airspring of claim 27, wherein the first and second pistons move relative to one another.*

* * * * *